US010543666B2

(12) United States Patent
Dalal et al.

(10) Patent No.: US 10,543,666 B2
(45) Date of Patent: Jan. 28, 2020

(54) COMPOSITE SANDWICH PANEL AND ASSOCIATED METHODS OF MANUFACTURE

(71) Applicant: The Boeing Company, Chicago, IL (US)

(72) Inventors: Hardik Dalal, Seattle, WA (US); Panagiotis E. George, Lake Tapps, WA (US); Kelsi M. Hurley, Kent, WA (US); Ashley C. Tracey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 14/754,066

(22) Filed: Jun. 29, 2015

(65) Prior Publication Data
US 2016/0375661 A1 Dec. 29, 2016

(51) Int. Cl.
*B32B 27/18* (2006.01)
*B23B 5/12* (2006.01)
(Continued)

(52) U.S. Cl.
CPC ............ *B32B 27/18* (2013.01); *B32B 5/12* (2013.01); *B32B 37/06* (2013.01); *B32B 37/08* (2013.01); *B32B 37/10* (2013.01)

(58) Field of Classification Search
None
See application file for complete search history.

(56) References Cited

U.S. PATENT DOCUMENTS 4,175,148 A * 11/1979 Luck ................ B27N 7/00
156/285
5,456,872 A * 10/1995 Ahrweiler ........ B29B 17/0042
264/115
(Continued)

FOREIGN PATENT DOCUMENTS

CN 1119581 4/1996
CN 1466639 1/2004
(Continued)

OTHER PUBLICATIONS

Plastronfoam: http://www.plastron-sarl.com/english/literature.htm (2012).*
(Continued)

*Primary Examiner* — David Sample
*Assistant Examiner* — Nicole T Gugliotta
(74) *Attorney, Agent, or Firm* — Kunzler Bean & Adamson (57) ABSTRACT

Disclosed herein is a composite sandwich panel that includes a first face portion with fully consolidated comingled first fibers and a first thermoplastic matrix. The composite sandwich panel also includes a second face portion with fully consolidated comingled second fibers and a second thermoplastic matrix. Additionally, the composite sandwich panel includes at least one core portion with partially consolidated comingled third fibers and a third thermoplastic matrix. The at least one core portion is interposed between the first and second face portions. The first thermoplastic matrix is melded with the third thermoplastic matrix and the second thermoplastic matrix is melded with the third thermoplastic. A density of the fibers across a thickness of the composite panel is non-uniform.

17 Claims, 9 Drawing Sheets

(51) Int. Cl.
*B32B 37/06* (2006.01)
*B32B 37/10* (2006.01)
*B32B 37/08* (2006.01)
*B32B 5/02* (2006.01)
*B32B 5/26* (2006.01)
*B32B 27/06* (2006.01)
*B32B 5/12* (2006.01)

(56) References Cited

U.S. PATENT DOCUMENTS

| | | | | |
|---|---|---|---|---|
| 5,528,806 A | * | 6/1996 | Yamashita | H03H 3/02 29/25.35 |
| 5,593,762 A | | 1/1997 | Ahrweiler | |
| 5,609,707 A | | 3/1997 | Bazshushtari et al. | |
| 5,667,857 A | | 9/1997 | Watanabe et al. | |
| 2010/0021718 A1 | * | 1/2010 | Vos | B32B 5/26 428/315.9 |
| 2012/0207989 A1 | * | 8/2012 | Xu | E04C 2/043 428/213 |

FOREIGN PATENT DOCUMENTS

| | | | |
|---|---|---|---|
| CN | 203974161 | 12/2014 | |
| CN | 203974161 U | * 12/2014 | ............... B32B 5/18 |
| WO | 2012101192 | 8/2012 | |
| WO | 2014162873 | 10/2014 | |

OTHER PUBLICATIONS

TechnicalTextile.net:https://www.technicaltextile.net/articles/heat-resistant-fibres-4015 (Year: 2019).*
HexWeb Honeycomb Sandwich Design Technology, Dec. 2000, pp. 1-28, Hexcel Composites, Duxford.
Chinese Office Action for Chinese Patent Application No. 201610355607.0 dated Apr. 17, 2019.

* cited by examiner

COMPOSITE SANDWICH PANEL AND ASSOCIATED METHODS OF MANUFACTURE

FIELD

This disclosure relates generally to components made from composite materials, and more particularly to a composite sandwich panel.

BACKGROUND

Composite materials, such as composite panels, are used in a variety of applications. In one application, composite panels are used for various structures of a vehicle, such as an aircraft. Desirably, composite panels have a high bending stiffness and resistance to shear forces. However, traditional non-sandwich composite panels fail to provide acceptable levels of both bending stiffness and resistance to shear forces without unduly increasing the weight and thickness of the panels. For example, conventional composite panels optimized for bending stiffness may not be fully utilizing the capability of all the layers within the composite panel, which results in a heavy panel. However, high bending stiffness in composite panels has been achieved by adding a high-shear-capable, low-density core layer made from a different material or differently configured material to create a lightweight sandwich composite panel with high bending stiffness. Despite the advantages of sandwich composite panel designs, the addition of the extra core layer results in increased cost and complexity compared to non-sandwich composite panel designs.

SUMMARY

The subject matter of the present application provides embodiments of composite sandwich panels, and associated methods and apparatuses, which overcome the above-discussed shortcomings of prior art composite panels. The subject matter of the present application has been developed in response to the present state of the art, and in particular, in response to shortcomings of conventional composite panels, including composite sandwich panels.

According to one embodiment, a composite sandwich panel includes a first face portion with fully consolidated comingled first fibers and a first thermoplastic matrix. The composite sandwich panel also includes a second face portion with fully consolidated comingled second fibers and a second thermoplastic matrix. Additionally, the composite sandwich panel includes at least one core portion with partially consolidated comingled third fibers and a third thermoplastic matrix. The at least one core portion is interposed between the first and second face portions. The first thermoplastic matrix is melded with the third thermoplastic matrix and the second thermoplastic matrix is melded with the third thermoplastic. A density of the fibers across a thickness of the composite panel is non-uniform.

In some implementations of the composite sandwich panel, a rate of change of the density of the fibers across the thickness of the composite sandwich panel is constant.

According to some implementations of the composite sandwich panel, the first fibers, second fibers, and third fibers are randomly oriented.

In certain implementations of the composite sandwich panel, the first, second, and third fibers include carbon fiber, and the first, second, and third thermoplastic matrices include polyphenylene sulfide.

In yet some implementations of the composite sandwich panel, the first and second fibers are made from a different material than the third fibers. The first and second thermoplastic matrices can be made from a different material than the third thermoplastic matrix.

According to some implementations of the composite sandwich panel, the at least one core portion includes a plurality of core portions each having a same consolidation percentage. In other implementations, the at least one core portion includes a plurality of core portions each having a different consolidation percentage.

In another embodiment, a first method of making a composite sandwich panel includes positioning at least one core sheet between first and second facesheets to form a stack. The first facesheet includes fully consolidated comingled first fibers and first thermoplastic filaments. The second facesheet includes fully consolidated comingled second fibers and second thermoplastic filaments. The at least one core sheet includes partially consolidated comingled third fibers and third thermoplastic filaments. The first method also includes compressing the stack. Additionally, the first method includes heating the stack while pressing the stack together.

According to some implementations of the first method, the at least one core sheet has a first consolidation percentage. The stack can be compressed and heated until the at least one core sheet has a second consolidation percentage higher than the first consolidation percentage.

In certain implementations of the first method, heating the stack includes melting the first, second, and third thermoplastic filaments into first, second, and third thermoplastic matrices, respectively. Heating the stack also includes melding the first and third thermoplastic matrices, and melding the second and third thermoplastic matrices.

In yet some implementations of the first method, the at least one core sheet includes a plurality of core sheets each having a consolidation percentage. The consolidation percentages of the plurality of core sheets can be the same or different.

According to certain implementations of the first method, a density of the fibers across a thickness of each of the first facesheet, second facesheet, and at least one core sheet is uniform.

In yet certain implementations of the first method, the first and second thermoplastic filaments are made from a different material than the third thermoplastic filaments.

In some implementations of the first method, the first and second thermoplastic filaments have first and second melting temperatures, respectively. The third thermoplastic filaments have a third melting temperature. The third melting temperature is less than each of the first and second melting temperatures. Heating the stack includes heating the first, second, and third thermoplastic filaments to a temperature of at least the first and second melting temperatures. Compressing the stack includes compressing the stack until the at least one core sheet becomes fully consolidated and the stack becomes a fully consolidated panel. After heating the first, second, and third thermoplastic filaments to the temperature of at least the first and second melting temperatures and compressing the stack until the at least one core sheet becomes fully consolidated and the stack becomes a fully consolidated panel, the first method further includes reducing the temperature of the fully consolidated panel to a temperature below the third melting temperature. After reducing the temperature of the fully consolidated panel to a temperature below the third melting temperature, the first method additionally includes releasing pressure on the fully consolidated panel while reheating the fully consolidated panel to a temperature of at least the third melting temperature and below the first and second melting temperatures.

According to another embodiment, a second method of making a composite sandwich panel includes providing at least one sheet comprising comingled fibers and thermoplastic filaments. The second method also includes heating the at least one sheet to melt the thermoplastic filaments and form a fully consolidated panel. Additionally, the second method includes cooling the fully consolidated panel. After cooling the fully consolidated panel, the second method includes reheating the fully consolidated panel from a first surface of the fully consolidated panel to induce a first temperature gradient across a thickness of the fully consolidated panel. The second method further includes non-uniformly lofting the fully consolidated panel to induce a first density gradient across the thickness of the fully consolidated panel proportional to the first temperature gradient to form a density gradient composite panel.

In some implementations of the second method, the density gradient composite panel includes a first density gradient composite panel. The second method can further include forming a second density gradient composite panel. Also, the second method can include bonding the first density gradient composite panel to the second density gradient composite panel to form a combined density gradient composite panel having symmetrical density gradients across a thickness of the combined density gradient composite panel.

According to some implementations, the second method additionally includes, after cooling the fully consolidated panel, reheating the fully consolidated panel from a second surface of the fully consolidated panel opposing the first surface to induce a second temperature gradient across a thickness of the fully consolidated panel. Also, the second method includes non-uniformly lofting the fully consolidated panel to induce a second density gradient across the thickness of the fully consolidated panel proportional to the second temperature gradient. The first density gradient can be symmetrical to the second density gradient.

In yet another embodiment, a composite sandwich panel includes a first face portion, a second face portion, and a core portion interposed between the first and second face portions. The core portion includes reinforcement fibers in a thermoplastic matrix. A density of the reinforcement fibers across a thickness of the core portion is non-uniform. The core portion also includes a blowing agent in some implementations.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
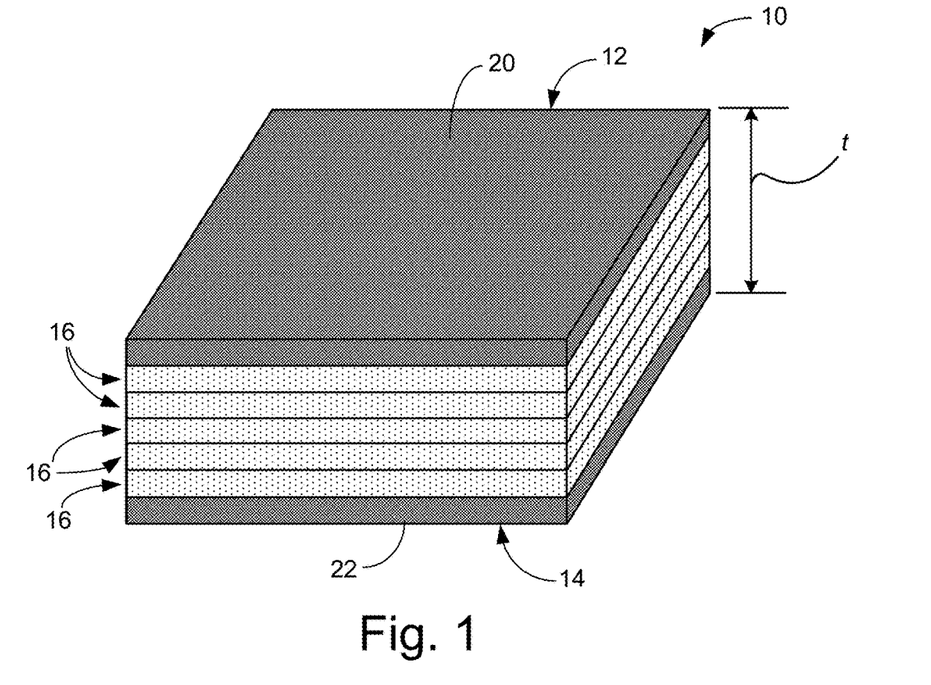
FIG. 1 is a perspective view of a stack of sheets each with comingled fibers and thermoplastic filaments, according to one embodiment.

Referring to FIG. 1, and according to one embodiment, a stack 10 of flat sheets is shown. The sheets include a first facesheet 12, a second facesheet 14, and a plurality of core sheets 16. The sheets are stacked relative to each other such that the core sheets 16 are interposed between the first and second facesheets 12, 14, respectively. In the illustrated embodiment, the sheets of the stack 10 are positioned one on top of the other. Each of the first facesheet 12, second facesheet 14, and core sheets 16 defines a thickness between respective top and bottom surfaces 20, 22. When stacked together to form the stack 10, the combined thicknesses of the sheets define an overall thickness t of the stack defined between a top and bottom surfaces of the stack (i.e., a top surface 20 of the first facesheet 12 and a bottom surface 22 of the second facesheet 14). Each sheet of the stack 10 can have the same or different thicknesses and/or amounts of material across an entire cross-section of the stack or across a portion of the cross-section of the stack. Moreover, according to some implementations, each sheet of the stack 10 has substantially the same area and peripheral shape such that the outer peripheries or edges of the sheets can be substantially flush with each other. However, in other implementations, the outer peripheries of the sheets can be differently shaped and not substantially flush with each other. For example, the stack 10 can be used to form non-flat or non-planar components. In some implementations, the sheets are stacked directly onto each other without any intervening layers, such as adhesives, between the sheets.

In some embodiments, the stack 10 is formed by positioning the plurality of core sheets 16 onto the second facesheet 14, and positioning the first facesheet 12 onto the plurality of core sheets 16. In the illustrated embodiments, each of the first and second facesheets 12, 14 include a single layer of material. However, in other embodiments, each of the first and second facesheets 12, 14 can include multiple layers of material. Positioning the plurality of core sheets 16 onto the second facesheet 14 can be accomplished by placing the core sheets one-by-one onto the second facesheet. Alternatively, a stack of core sheets 16 can be preformed and collectively positioned onto the second facesheet 14.

Although the stack 10 illustrated in FIG. 1 includes one first facesheet 12, one second facesheet 14, and five core sheets 16, in other embodiments, a stack can include fewer or more than five core sheets. Additionally, although the thickness of each of the first facesheet 12, second facesheet 14, and core sheets 16 of the stack 10 is substantially the same in the illustrated embodiment, in other embodiments, the thickness of each of the sheets of a stack need not be the same. For example, the thickness of each of the core sheets 16 can be more or less than the thickness of each of the first and second facesheets 12, 14. Alternatively, or additionally, the thickness of the first facesheet 12 can be different than the thickness of the second facesheet 14. A desired overall thickness t of the stack, and a desired relative thickness of the core sheets 16 compared to the first and second facesheets 12, 14, can be achieved by an adjustment in the thicknesses of the sheets and/or in quantity of sheets. For example, an overall thickness t of a stack can be changed by changing the number of core sheets or facesheets or by changing a thickness of one or more of the core sheets or facesheets.

Figure 7:
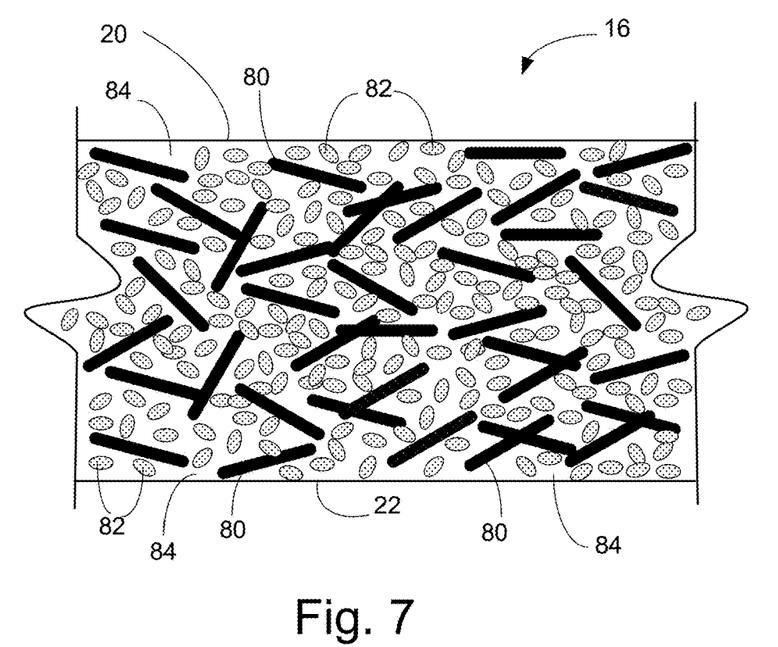
FIG. 7 is a side elevation view of a sheet of comingled fibers and thermoplastic filaments, according to one embodiment.
Figure 8:
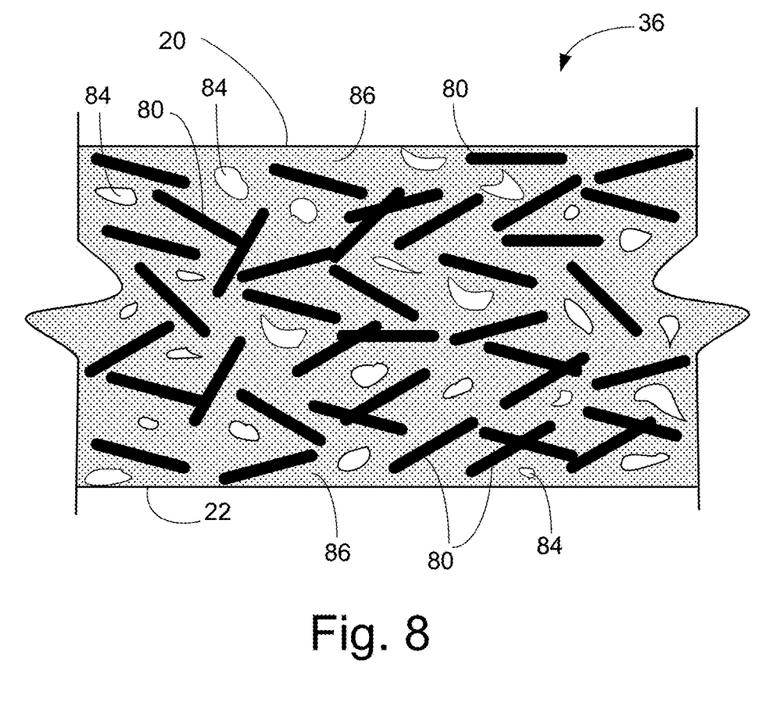
FIG. 8 is a side elevation view of a composite panel formed from the sheet of FIG. 7, according to one embodiment.

Each sheet of the stack 10 includes comingled fibers and thermoplastic filaments. For example, as shown in FIG. 7, a cross-section of a core sheet 16 includes a plurality of fibers 80 comingled with a plurality of thermoplastic filaments 82. As defined herein, the fibers 80 are reinforcement fibers. Referring to FIG. 8, the plurality of thermoplastic filaments 82 become fully consolidated into a co-continuous thermoplastic matrix 86 with the addition of heat and pressure. Accordingly, under heat and pressure, the co-mingled fibers 80 and thermoplastic filaments 82 become fiber in a thermoplastic co-continuous matrix (i.e., a fiber reinforced thermoplastic). The fibers can be any of various natural or synthetic fibers known in the art. For example, the fibers 80 can be one or more of carbon fibers, glass fibers, aramid fibers, and the like. Similarly, the thermoplastic filaments 82 can be any of various thermoplastic filaments known in the art, such as, for example, acrylonitrile-butadiene-styrene, polyvinyl chloride, high-density polyethylene, nylon, polyethersulfone, polyetherimide, polyphenylene sulfide (PPS), and the like. The core sheet 16, and facesheets 12, 14 in some implementations, may include voids 84 or free space between the fibers 80 and thermoplastic filaments 82. According to some embodiments, the facesheets 12, 14 can be made from other materials, such as a woven material, nonwoven mat, fabric, unidirectional tape, and the like.

One embodiment of a method of making a sheet of comingled fibers 80 and thermoplastic filaments 82 includes thoroughly mixing together the fibers, thermoplastic filaments, and a binder to form a mixture of dispersed fibers and filaments and allowing the mixture to set into a sheet-like shape, which can include drying the material to remove the binder. Because the fibers 80 and thermoplastic filaments 82 are thoroughly mixed, the density (e.g., fiber density) of the mixture is substantially uniform across a thickness of the sheet. As defined herein, the density of fibers or fiber density does not refer to the density of each individual fiber, but rather refers to the areal weight of fibers (i.e., weight per unit area of fibers) in a sheet/panel or the distribution of fibers in the sheet/panel.

The density of the fibers 80 across the thickness of the sheet is dependent on the quantity and size of fibers, thermoplastic filaments 82, and voids 84 between the fibers, and thermoplastic filaments. Accordingly, for a given quantity and size of fibers, thermoplastic filaments, and binder, the density of fibers depends on the size and quantity of the voids or free space in the sheet. The characteristics of the voids in a sheet of comingled fibers and thermoplastic filaments can be expressed in terms of a consolidation of the sheet, or a loftiness or bulk factor of the sheet. The consolidation of a sheet is defined as the volume percentage of voids in a sheet relative to the total volume of the sheet. For example, a sheet with a consolidation of 100% (e.g., 100% consolidated) has no voids or free spaces between the fibers and thermoplastic filaments (or thermoplastic matrix after the thermoplastic filaments are melted to form a panel as will be described in more detail below). In contrast, a sheet with a consolidation of 30% (e.g., 30% consolidated) has voids between the fibers and thermoplastic filaments that occupy approximately 70% of the total volume of the sheet. The consolidation of a sheet can also be expressed as the loft of the sheet. Generally, after the fibers, thermoplastic filaments are mixed and deposited onto a belt, the mixture can have any of various desired consolidations.

The performance of a sheet of comingled fibers and thermoplastic filaments depends on the consolidation of the sheet, the properties of the fibers, and the properties of the thermoplastic filaments. The higher the consolidation of the sheet, the stronger/stiffer the sheet. However, the higher the consolidation of the sheet, the heavier the sheet per unit thickness. Accordingly, for a given sheet, there is a trade-off between the strength/stiffness and the thickness of the sheet. But, leveraging sandwich panel theory, a sheet, or panel made from multiple sheets, with a lightweight core portion interposed between denser (e.g., heavier per unit thickness) face portions exhibits a higher bending stiffness than a sheet, or panel, with just the heavier face portions. In other words, with a minimal increase in the overall weight, the stiffness of a sheet, or panel of multiple sheets, can be significantly increased by adding a lightweight core to the sheet or panel. Further, the strength (e.g., shear strength) and durability of a sandwich panel with a lightweight core portion between face portions can be increased by reducing or eliminating the use of adhesives to bond together the core portion and face portions.

Figure 2:
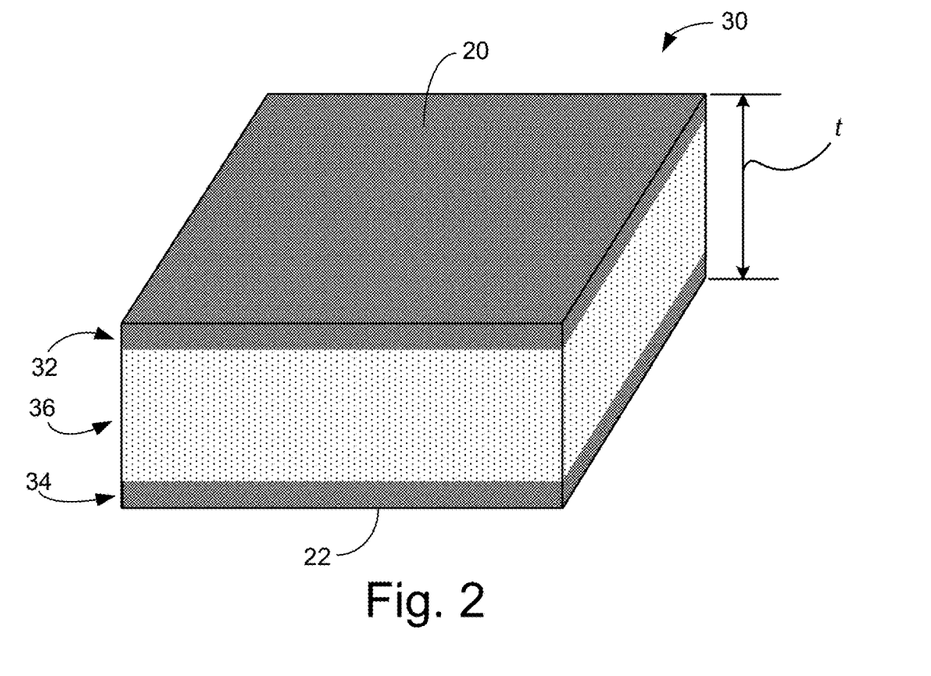
FIG. 2 is a perspective view of a composite panel formed from the stack of FIG. 1, according to one embodiment.

Referring to FIGS. 1 and 2, the stack 10 is converted into a composite sandwich panel 30 with a core portion 36 between opposing first and second face portions 32, 34. The first facesheet 12 and the second facesheet 14 each has a consolidation higher than the core sheets 16. For example, the first facesheet 12 and second facesheet 14 may have a consolidation of 100% (e.g., fully consolidated or 100% consolidated), and each of the core sheets 16 may have a consolidation less than 100% (e.g., partially consolidated). In the illustrated embodiment of FIG. 1, the consolidation of each of the core sheets 16 is the same. As defined herein, partial consolidation can be any consolidation less than 100% consolidated. However, in some implementations, partial consolidation is a consolidation less than about 95% consolidated. According to one implementation, for example, each core sheet 16 is about 75% consolidated.

Generally, under pressure and heat, the first facesheet 12 becomes the first face portion 32, the second facesheet 14 becomes the second face portion 34, and the core sheets 16 collectively become the core portion 36 of the composite sandwich panel 30. Accordingly, the first and second face portions 32, 34 of the composite sandwich panel 30 have the same consolidation as the first and second facesheets 12, 14, respectively, and the core portion 36 has at least a slightly higher consolidation than each of the core sheets 16. Therefore, the consolidation of a sheet prior to the application of heat and pressure may be considered an initial consolidation of the sheet, and the consolidation of a panel after the application of heat and pressure may be considered a final consolidation. But, the pressure is controlled such that the first and second face portions 32, 34 have a higher consolidation than the core portion 36. Moreover, because the core sheets 16 each have the same consolidation, the core portion 36 has a uniform fiber density or consolidation across a thickness of the core portion. In certain implementations, although the fiber density or consolidation is uniform across the thickness of the core portion 36, the consolidation of the core portion may be significantly higher than the consolidation of each of the core sheets 16, yet still lower than the consolidation of the first and second face portions 32, 34, if the pressure applied to the stack 10 is sufficiently high. Because the fiber density or consolidation of the composite sandwich panel 30 changes across a thickness of the panel (e.g., from high, to low, to high), the panel can be considered to have a non-uniform fiber density or fiber density gradient across its thickness.

Figure 13:
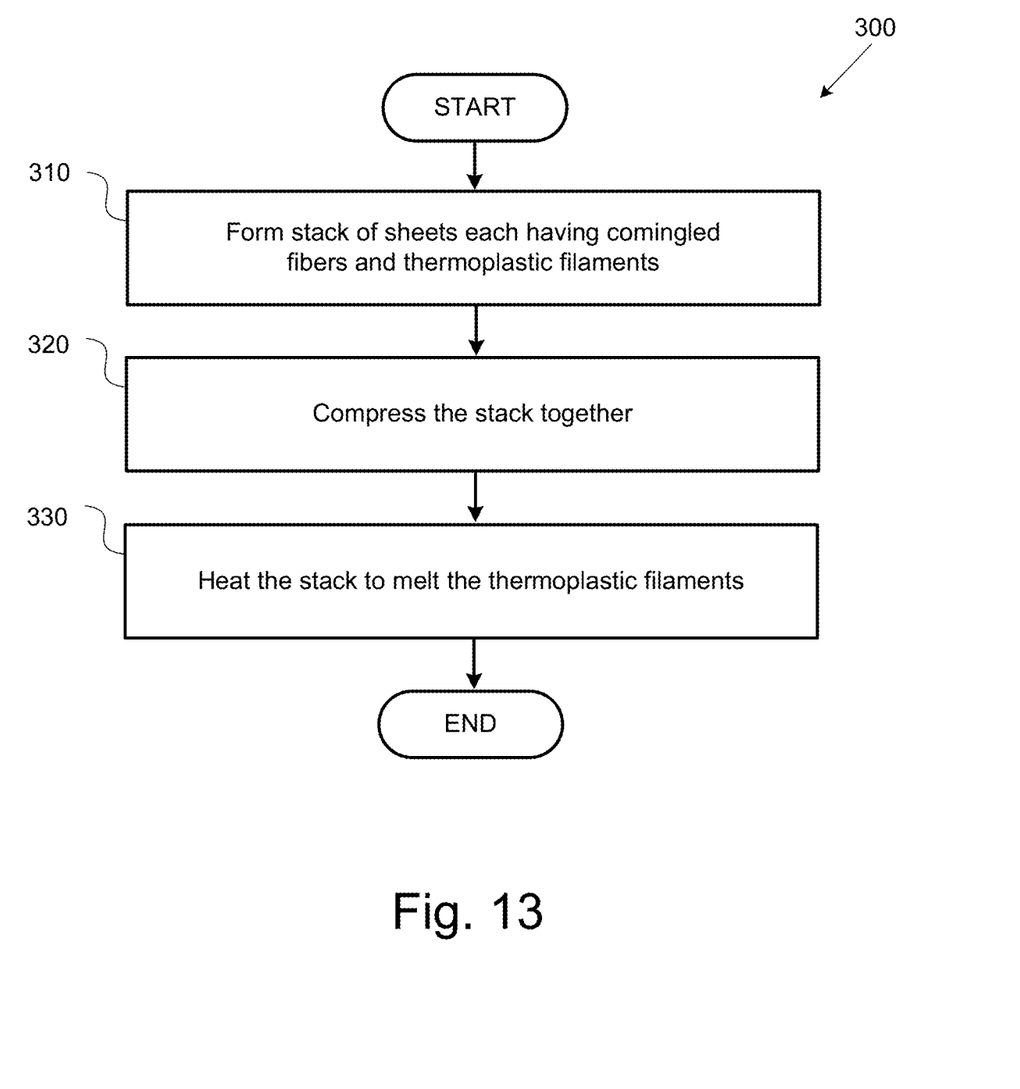
FIG. 13 is a schematic flow diagram of a method of making a composite panel, according to one embodiment.

In one embodiment of a method 300 shown in FIG. 13, the stack 10 is formed at 310 and made into the composite sandwich panel 30 by compressing the stack at 320 and heating the stack at 330. Generally, the pressure and heat applied to the stack 10 is sufficient to compress and melt the thermoplastic filaments in the first facesheet 12, second facesheet 14, and core sheets 16 into the first face portion 32, second face portion 34, and core portion 36, respectively. Referring to FIG. 8, one example of a section of the core portion 36 formed from the core sheet 16 of FIG. 7 is shown. The section of the core portion 36 includes the fibers 80, and melted thermoplastic filaments 82 or thermoplastic matrix 86. The fibers 80 are effectively suspended in the thermoplastic matrix 86, which is formed by the melting and melding together of the thermoplastic filaments 82. The section of the core portion 36 also includes voids 84 suspended in the thermoplastic matrix 86. The collective volume of the voids 84 in the section of the core portion 36 may be the same as or less than the collective volume of the voids in the core sheet 16. If desired, the pressure applied to the core sheet 16 is selected to retain in the section of the core portion 36 the same consolidation of the core sheet or the same volume of voids 84 as in the core sheet. In contrast, the pressure applied to the core sheet 16 can be selected to increase the consolidation of the section of the core portion 36 or decrease the volume of voids 84 in the section of core portion compared to the core sheet.

The melted thermoplastic filaments or thermoplastic matrix of each sheet meld or intermix with the melted thermoplastic filaments or thermoplastic matrix of one or two adjacent sheets. For example, the thermoplastic matrix of the first face portion 32 of the panel 30 melds with the thermoplastic matrix of the core portion 36, the thermoplastic matrix of the second face portion 34 of the panel melds with the thermoplastic matrix of the core portion, and the thermoplastic matrix of the core portion melds with both the matrices of the first and second face portions. The melding of thermoplastic matrices from two sheets bonds the two sheets together without an intervening adhesive layer. Moreover, in certain implementations, the bond formed between melded thermoplastic matrices of adjacent sheets is stronger (e.g., able to withstand higher shear stress) and lighter than the bond formed by interposing a separate adhesive layer between the sheets. Because the melted thermoplastic filaments or thermoplastic matrices of adjacent sheets melt or intermix together, in some implementations, such as shown, there is no distinct bond line between adjacent sheets.

Figure 9:
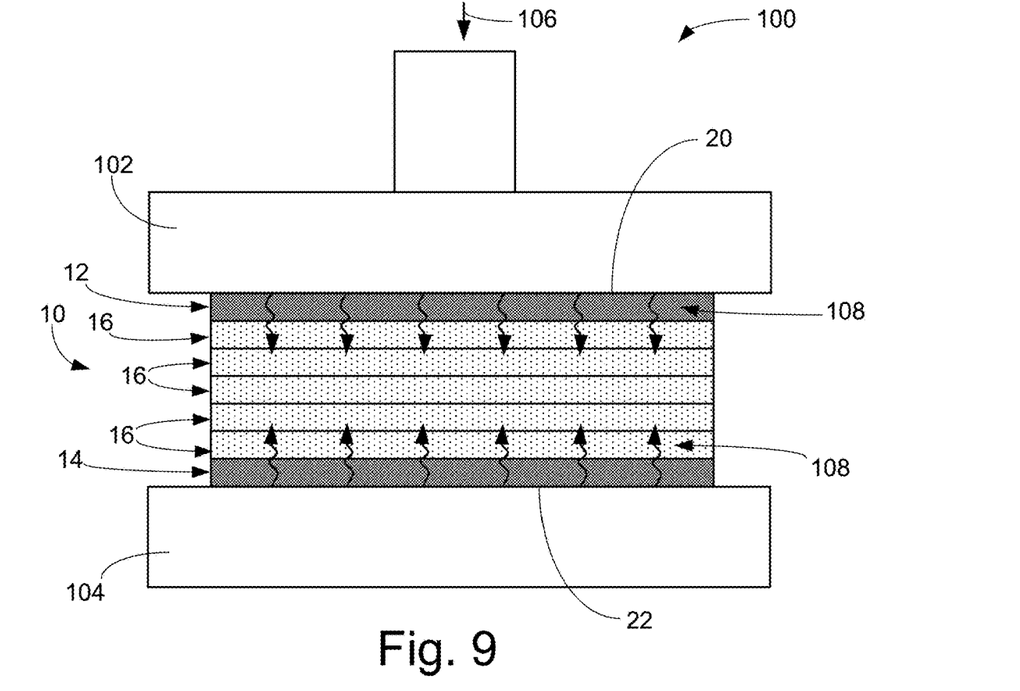
FIG. 9 is a system for making a first composite panel, according to one embodiment.
Figure 10:
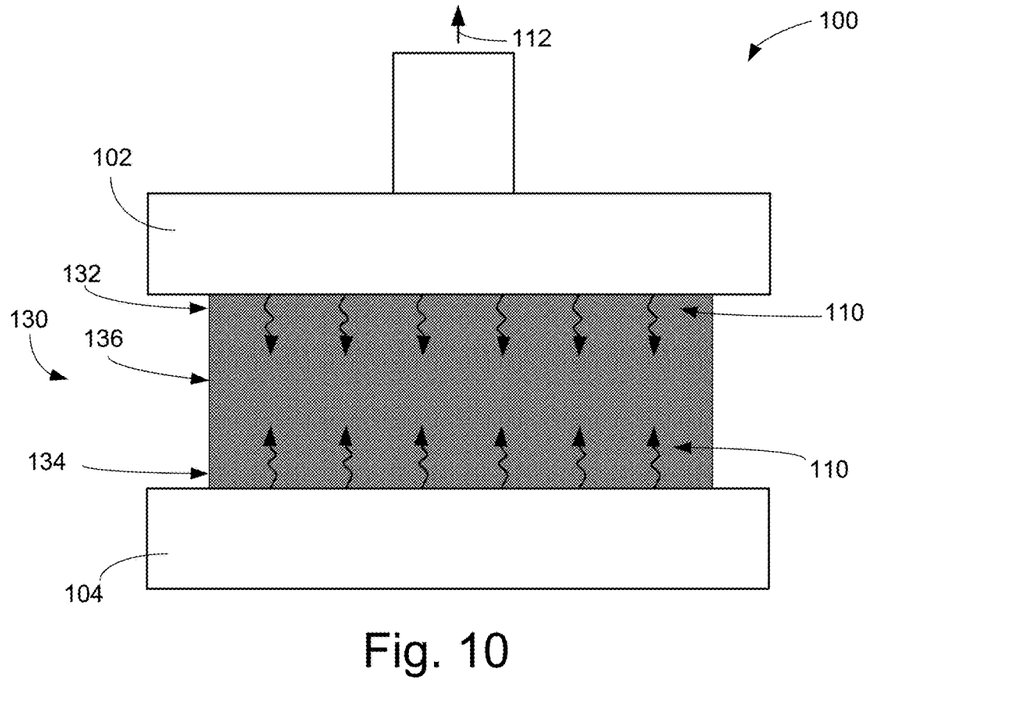
FIG. 10 is a system for making a second composite panel, according to one embodiment.

Referring to FIG. 9, one embodiment of an apparatus 100 for making a composite sandwich panel from a stack of sheets made from comingled fibers and thermoplastic filaments is shown. The apparatus 100 includes a first platen 102 and a second platen 104. The first and second platens 102, 104 are movable relative to each other to apply pressure to the stack 10 interposed between the first and second platens. Accordingly, at least one of the first and second platens is movable relative to a stationary reference. In the illustrated embodiment, the second platen 104 is non-movable relative to the stationary reference to act as a stationary platform upon which the stack 10 is supported, while the first platen 102 is movable relative to the stationary reference as indicated by directional arrow 106 to apply pressure to the stack (e.g., close a press). In other embodiments, the first platen 102 can be fixed relative to the stationary reference, and the second platen 104 can be movable relative to the stationary reference. According to yet other embodiments, both the first and second platens 102, 104 are movable relative to the stationary reference. With the stack 10 interposed between and in contact with the first and second platens 102, 104, the application of pressure to the stack 10 by relative movement toward each other compresses the stack. The apparatus 100 can be controlled to apply a desired pressure to the stack 10 at a desired rate until a desired consolidation of the core sheets 16 or core portion 36 is reached and/or a desired overall thickness of the composite sandwich panel 30 is reached.

In some embodiments, one or both of the first and second platens 102, 104 is configured to heat the stack 10 via conduction. As shown, in one implementation, each of the first and second platens 102, 104 generates and transmits heat 108 into the stack 10 to heat the stack. The heat 108 is applied to the stack 10 for a desired period of time. The desired period of time may be sufficient for the temperature of each sheet 12, 14, 16 in the stack 10 to reach the same final temperature. The level of heat can be modulated as desired to achieve any of various final temperatures of the sheets 12, 14, 16 of the stack 10. In other embodiments, heat is transmitted to the stack 10 to increase the temperature of the stack via other techniques, such as radiation and convection, and apparatuses.

The final temperatures of the sheets 12, 14, 16 are at least as high as the melting or softening temperatures of the thermoplastic filaments 82 of the sheets. However, as will be described in more detail below, in some embodiments, the thermoplastic filaments 82 of one or more of the sheets may have a different melting or softening temperature such that the making of a composite sandwich panel includes heating the stack of sheets to multiple final temperatures.

Figure 14:
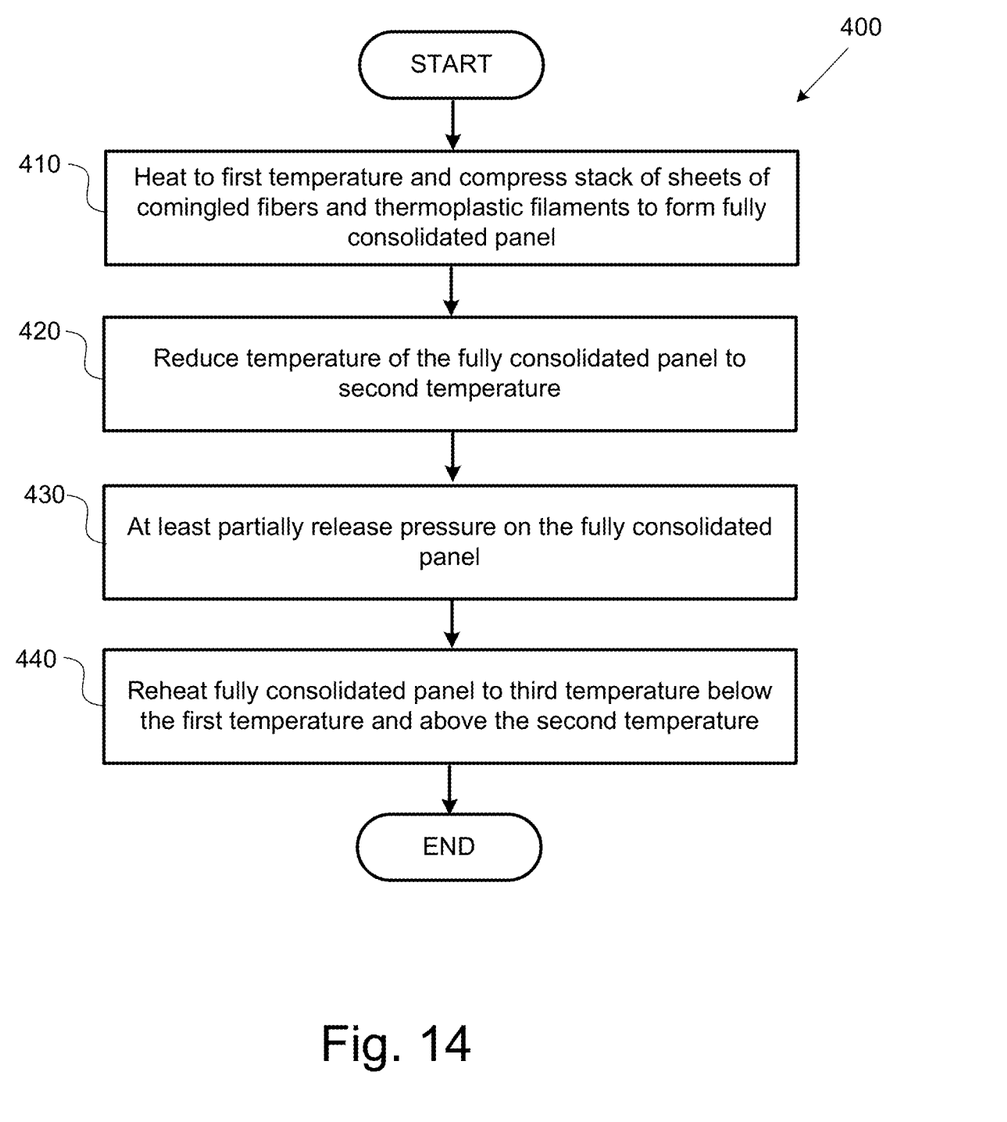
FIG. 14 is a schematic flow diagram of a method of making a composite panel, according to another embodiment.

The apparatus 100 may also be used to convert the stack 10 into a composite sandwich panel according to a different method 400 shown in FIG. 14. Performance of the method 400 produces a composite sandwich panel similar to the composite sandwich panel 30. However, as will be explained in more detail, the face portions of the composite sandwich panel produced by the method 400 have a different thermoplastic than the core portion.

According to some embodiments, the first facesheet 12, second facesheet 14, and core sheets 16 of the stack 10 have first, second, and third thermoplastic filaments, respectively. The first and second thermoplastic filaments of the first and second facesheets 12, 14, respectively, can be made from a different material than the third thermoplastic filaments of the core sheets 16. Moreover, the first and second thermoplastic filaments can be made from the same material. The first and second thermoplastic filaments have first and second melting temperatures higher than a first melting temperature of the third thermoplastic filaments.

The method 400 includes heating and compressing the stack 10 of sheets to form a fully consolidated panel, such as the fully consolidated panel 130 of FIG. 9, at 410. More specifically, the stack 10 is heated to a first temperature at least as high as the first and second melting temperatures of the thermoplastic filaments of the first and second facesheets 12, 14. Accordingly, heating the stack 10 to the first temperature melts the first and second thermoplastic filaments of the first and second facesheets 12, 14. Because the third melting temperature of the third filaments is lower than the first and second melting temperatures, heating the stack 10 to the first temperature also melts the third thermoplastic filaments of the core sheets 16. Compression of the stack 10 reduces the voids in and increases the consolidation of the core sheets 16 until the core sheets are 100% consolidated to match the consolidation of the first and second facesheets 12, 14. However, in some implementations, the stack 10 is compressed to increase the consolidation of the core sheets 16 to a consolidation less than 100%, but more than the initial consolidation of the core sheets.

Melting of the first and second thermoplastic filaments converts the first and second facesheets 12, 14 into first and second portions 132, 134, respectively, of the fully consolidated panel 130. Similarly, melting the third thermoplastic filaments and compressing the core sheets 16 to full consolidation converts the core sheets into a core portion 136 of the fully consolidated panel 130, which is interposed between the first and second face portions 132, 134. Although the first face portion 132, second face portion 134, and core portion 136 are fully consolidated, the thermoplastic of the first and second portion remains different than the thermoplastic of the core portion.

After the fully consolidated panel 130 is formed by heating and compressing the stack 10 at 410, the method 400 includes reducing the temperature of the fully consolidated panel 130 at 420. The temperature of the fully consolidated panel 130 is reduced to a second temperature that is below the third melting temperature of the third filaments, and by extension the first and second melting temperatures of the first and second filaments. Reducing the temperature of the fully consolidated panel 130 to below the third melting temperature at least partially solidifies the thermoplastics of the fully consolidated panel. In some implementations, the temperature of the fully consolidated panel 130 is sufficiently reduced and/or held the reduced temperature for a sufficient amount of time to fully solidify the thermoplastics of the fully consolidated panel.

After the temperature of the fully consolidated panel 130 is reduced at 420, the method 400 includes at least partially releasing pressure on the fully consolidated panel at 430. As shown in FIG. 9, releasing pressure on the fully consolidated panel at 430 may include moving the first platen 102 of the apparatus 100 away from the second platen 104 in the direction 112 (e.g., opening a press). In other words, releasing pressure on the fully consolidated panel at 430 is associated with increasing a gap between the first and second platens 102, 104. The amount of pressure released from the fully consolidated panel (i.e., the thickness of the gap between the first and second platens 102, 104) is selected according to a desired consolidation or lofting of the core portion 136 of a composite sandwich panel formed from the fully consolidated panel 130. More specifically, releasing more pressure (i.e., a larger gap between the first and second platens 102, 104) may be selected for relatively lower consolidations or higher lofting of the core portion 136, and releasing less pressure (i.e., a smaller gap between the first and second platens) may be selected for relatively higher consolidations or lower lofting of the core portion. To aid in lofting or reducing the consolidation of the core portion 136 of the fully consolidated panel at 430, a blowing agent can be added to the core sheets 16 of the stack 10 prior to heating and compressing the core sheets at 410. Generally, the blowing agent can be any substance capable of producing a cellular structure via a foaming process that facilitates the lofting of the core portion 136. The blowing agent can be configured for activation via thermal expansion or chemical reaction.

Before, during, or after releasing pressure from the fully consolidated panel 130 at 430, the method 400 includes heating the fully consolidated panel 130 to a third temperature at 440. The third temperature is less than the first temperature and more than the second temperature. Accordingly, reapplying heat 110 to the fully consolidated panel 130 to increase the temperature of the panel to the third temperature results in the thermoplastic of the core portion 136 of the fully consolidated panel 130 being re-melted, while softening, without re-melting, the thermoplastics of the first and second face portions 132, 134. Melting the thermoplastic of the core portion 136 of the fully consolidated panel along with releasing pressure from the fully consolidated panel allows the core portion to loft relative to the first and second face portions 132, 134, thereby decrease the consolidation of the core portion while maintaining the fully consolidated first and second face portions. Generally, at the melt temperature, internal stresses within the panel can be relieved to allow the fibers to straighten, which results in lofting of the panel. Also, with the core portion 136 being re-melted and the first and second face portions 132, 134 being softened, the panel can be molded into a desired shape. Because the fiber density or consolidation of the core portion 136 becomes different than the first and second face portions 132, 134, the resulting panel, which would be similar to the panel 30, can be considered to have a non-uniform density or density gradient across its thickness.

Figure 3:
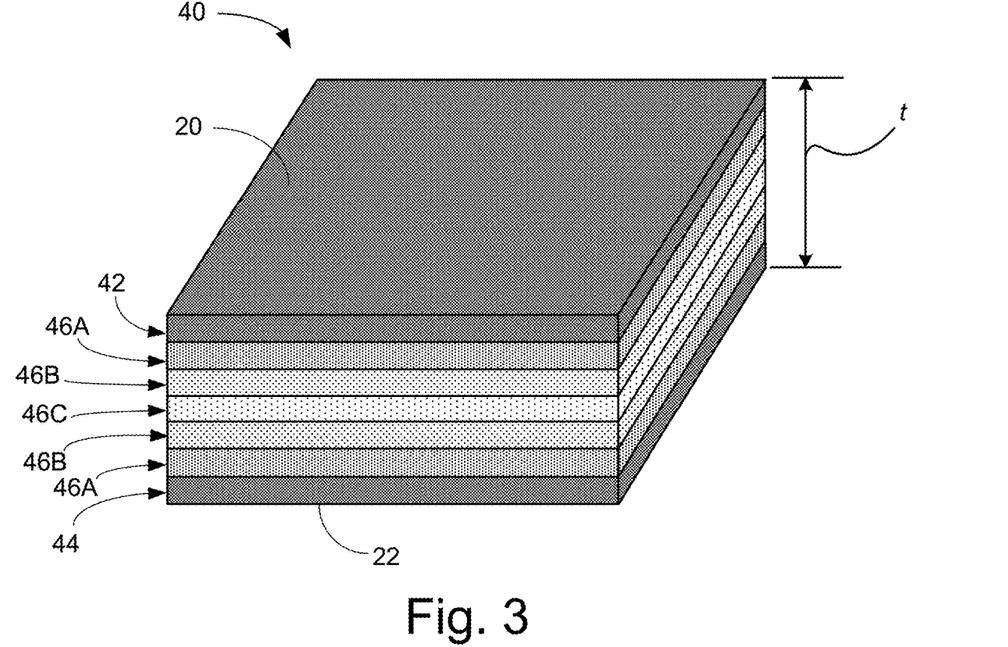
FIG. 3 is a perspective view of a stack of sheets each with comingled fibers and thermoplastic filaments, according to another embodiment.

Referring back to FIGS. 9 and 13, the method 300 and apparatus 100 may also be used to convert a stack of sheets different than the stack 10 into a composite sandwich panel different than the composite sandwich panel 30. For example, referring to FIG. 3, a stack 10 includes a first facesheet 42, a second facesheet 44, and a plurality of core sheets 46A-C interposed between the first and second facesheets. Like the stack 10, the first and second facesheets 42, 44 may be fully consolidated and the five core sheets 46A-C may be partially consolidated. However, unlike the core sheets 16 of the stack 10, the core sheets 46A-C of the stack 10 have different consolidations. Generally, the core sheets 46A-C are arranged such that the consolidation or fiber density decreases from the first and second facesheets 42, 44 toward a mid-plane between the first and second facesheets. Additionally, in certain implementations, the number and consolidation of the core sheets 46A-C are selected such that the decrease in density is symmetrical relative to or about the mid-plane. More specifically, the core sheets 46A each has a first consolidation, the core sheets 46B each has a second consolidation different than the first consolidation, and the core sheet 46C has a third consolidation different than the first and second consolidations. In the illustrated embodiment, for example, the first consolidation is lower than the consolidation of the first and second facesheets 42, 44 and higher than the second consolidation, and the second consolidation is higher than the third consolidation.

Figure 4:
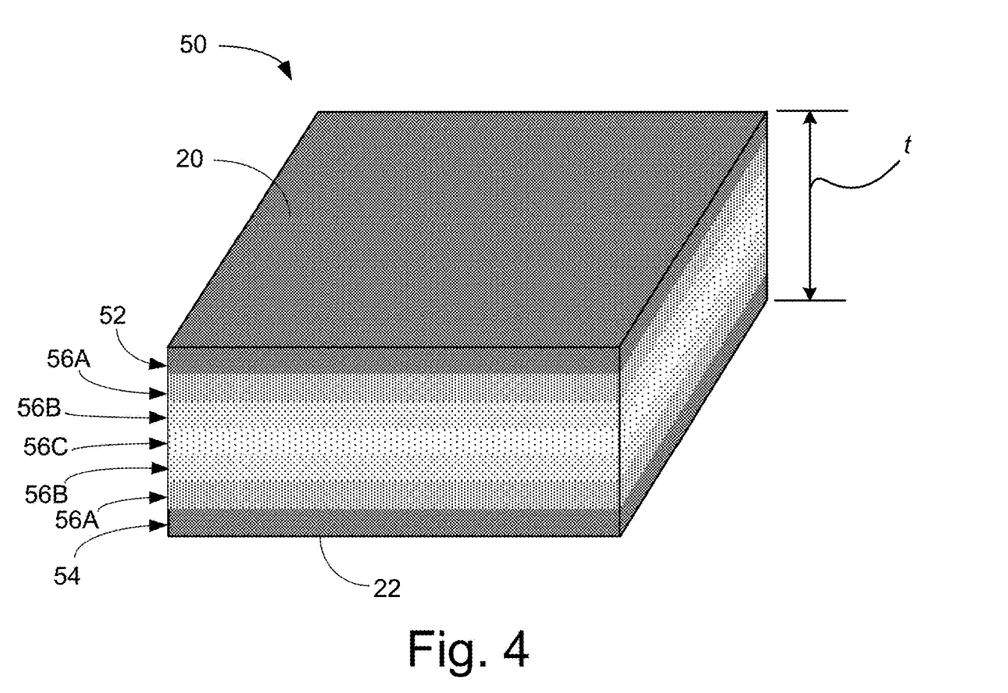
FIG. 4 is a perspective view of a composite panel formed from the stack of FIG. 3, according to one embodiment.

Under pressure and heat applied by the apparatus 100 according to the method 300, the first facesheet 42 becomes the first face portion 52, the second facesheet 44 becomes the second face portion 54, and the core sheets 46A-C collectively become the core portion of the composite sandwich panel 50. More specifically, the core sheets 46A become first core portions 56A, the core sheets 46B become second core portions 56B, and the core sheet 46C becomes a third core portion 56C. Generally, the portions of the composite sandwich panel 50 share the same consolidation as the corresponding sheets. Due to the different consolidations and arrangement of the core sheets 46A-C, the core portion of the composite sandwich panel 50 has a non-uniform fiber density or consolidation across a thickness of the core portion. But, because the fiber density or consolidation across the thickness of each of the core sheets 46A-C is uniform, the non-uniformity of the fiber density or consolidation across the thickness of the core portion occurs in a stepwise manner. The non-uniform fiber density or consolidation across the thickness of the core portion of the composite sandwich panel 50 corresponds with a decrease in the fiber density or consolidation from the first and second face portions 52, 54 toward and symmetrical about a mid-plane between the first and second face portions. Because the fiber density or consolidation of the composite sandwich panel 50 changes across a thickness of the panel, and more particularly a thickness of the core portion of the panel, the panel can be considered to have a non-uniform density or density gradient across its thickness.

Figure 5:
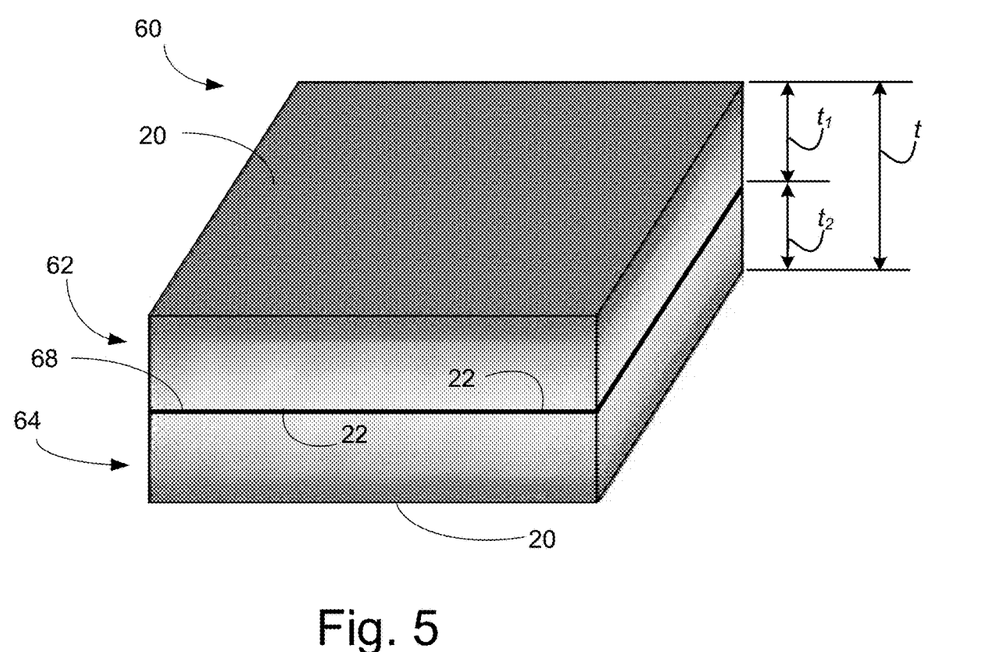
FIG. 5 is a perspective view of a composite panel, according to one embodiment.

Referring to FIG. 5, a composite sandwich panel 60 according to another embodiment is shown. Like the composite sandwich panels 30, 50, the composite sandwich panel 60 has a non-uniform density or density gradient across its thickness. However, unlike the composite sandwich panels 30, 50, the density gradient across the thickness of the composite sandwich panel 60 is continuous (e.g., linear, gradual, or non-stepwise). The composite sandwich panel 60 includes first and second subpanels 62, 64 or halves that are adhered together by an adhesive 68. Generally, without considering the thickness of the adhesive 68, the overall thickness t of the composite sandwich panel 60 is approximately equal to the sum of the thickness $t_1$ of the first subpanel 62 and the thickness $t_2$ of the second subpanel 64.

Each subpanel 62 has a non-uniform density or density gradient across its thickness. However, unlike the composite sandwich panels 30 and 50, the density gradient across the thickness of each subpanel 62, 64 does not decrease and then increase. Rather, the density gradient across the thickness of each subpanel 62, 64 only decreases or increases depending on the perspective. Generally, the density gradients of the subpanels 62, 64 are effectively mirror-images of each other. More specifically, the density gradient of the composite sandwich panel 60 is symmetrical relative to or about the adhesive 68, which defines a mid-plane of the composite sandwich panel.

According to some embodiments, the subpanels 62, 64 are made separately and assembled together to form the composite sandwich panel 60. In one embodiment, the subpanels 62, 64 are substantially identical subpanels with one subpanel being inverted and attached to the other subpanel with the adhesive 68 to form the composite sandwich panel 60. Accordingly, each subpanel 62, 64 can be made using the same manufacturing process or identical manufacturing processes. For example, a single subpanel sheet with a desired density gradient of one subpanel can be formed and cut into the separate subpanels 62, 64. Alternatively, each subpanel with the desired density gradient can be separately formed.

Figure 15:
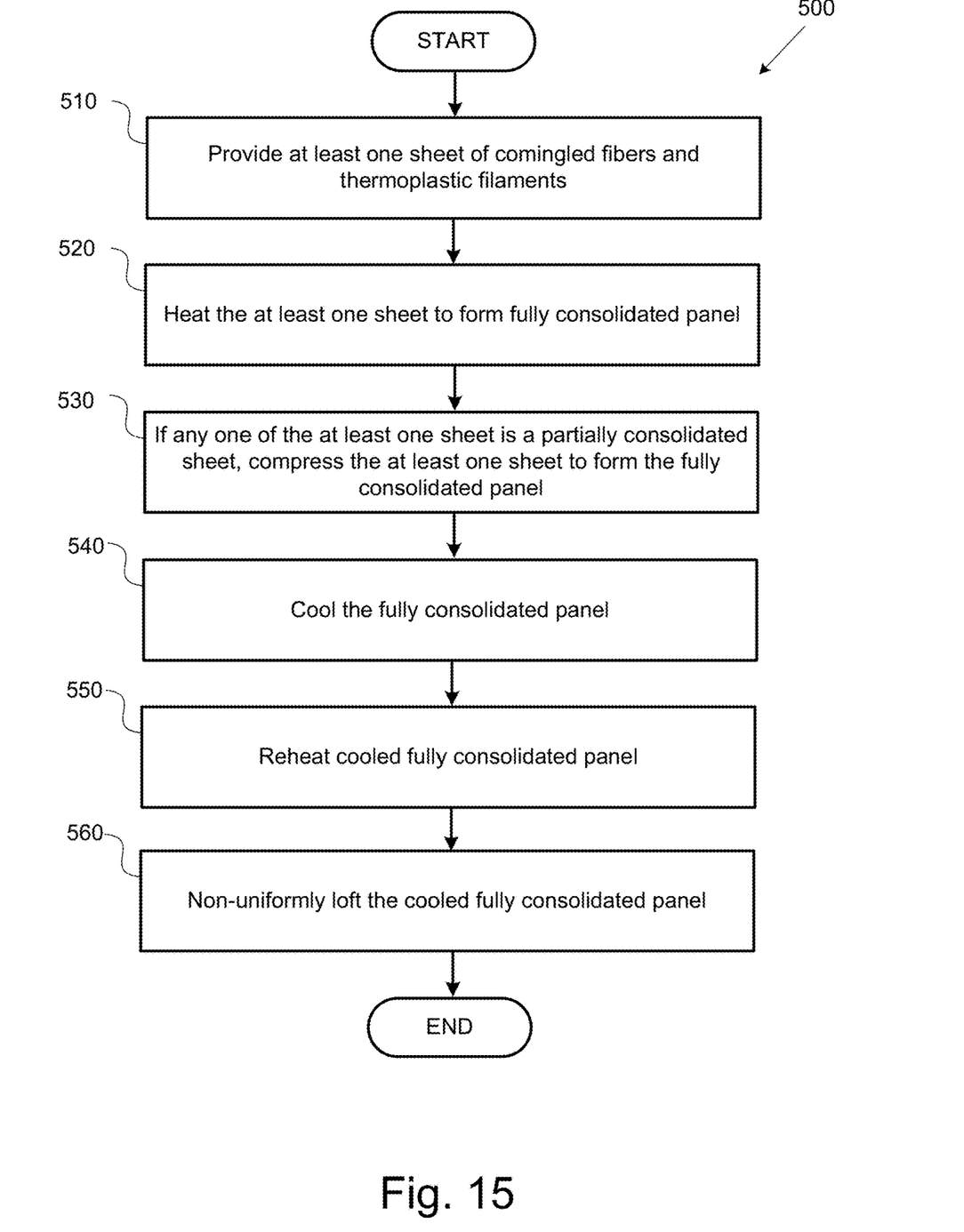
FIG. 15 is a schematic flow diagram of a method of making a composite panel, according to another embodiment.

According to one embodiment, the subpanels 62, 64 are formed using a method 500 shown in FIG. 15. The method 500 includes providing at least one sheet of comingled fibers and thermoplastic filaments at 510. In some implementations, the at least one sheet of comingled fibers and thermoplastic filaments is one fully or partially consolidated sheet. In yet other implementations, the at least one sheet includes a plurality of fully or partially consolidated sheets in the form of a stack. The at least one sheet of comingled fibers and thermoplastic filaments is heated to form a fully consolidated panel (e.g., fully consolidated panel 230 of FIG. 11) at 520. The heat applied to the at least one sheet at 520 melts the thermoplastic filaments. In addition to the application of heat, the at least one sheet of comingled fibers and thermoplastic filaments may be compressed to form the fully consolidated panel 230 at 530. For example, if any one of the at least one sheet is a partially consolidated sheet, the at least one sheet is also compressed until the sheet becomes a fully consolidated panel. In one implementation, the at least one sheet includes a stack of partially consolidated sheets that are heated and compressed until the sheets form a fully consolidated panel. Even if the at least one sheet includes only fully consolidated sheets, the fully consolidated panel can be formed by heating the fully consolidated sheets with at least a nominal application of pressure. Accordingly, whether the at least one sheet includes partially or fully consolidated sheets, the at least one sheet is formed into a fully consolidated panel. The steps 520, 530 of the method 500 can be performed by the apparatus 100 in some implementations.

After the fully consolidated panel 230 is formed, the method 500 includes cooling the fully consolidated panel at 540 to form a cooled fully consolidated panel. Cooling the fully consolidated panel 230 includes reducing the temperature of the fully consolidated panel down to a desired baseline temperature associated with solidifying of the melted thermoplastic. The desired baseline temperature may be any of various temperatures below the melting temperature of the thermoplastic of the fully consolidated panel. In one implementation, the desired baseline temperature is about room temperature (e.g., between about 60° F. and about 80° F.). However, in other implementations, the desired baseline temperature is below or above room temperature.

After cooling the fully consolidated panel 230 at 540, the method 500 includes reheating the cooled fully consolidated panel at 550. Reheating the cooled fully consolidated panel 230 at 550 includes introducing heat from only one side or surface, such as the bottom surface 22, of the cooled fully consolidated panel. The heat diffuses into the fully consolidated panel 230 across a thickness of the panel from the surface of the panel to which heat is applied. As the heat diffuses into the fully consolidated panel 230 for a desired period of time, a temperature gradient is formed across the thickness of the panel. In other words, before the temperature of the panel reaches equilibrium, the temperature of the fully consolidated panel 230 across a thickness of the panel is non-uniform. Generally, the temperature of the fully consolidated panel 230 decreases from the surface of the panel to which heat is applied toward the opposite surface of the panel, such as the top surface 20.

Figure 11:
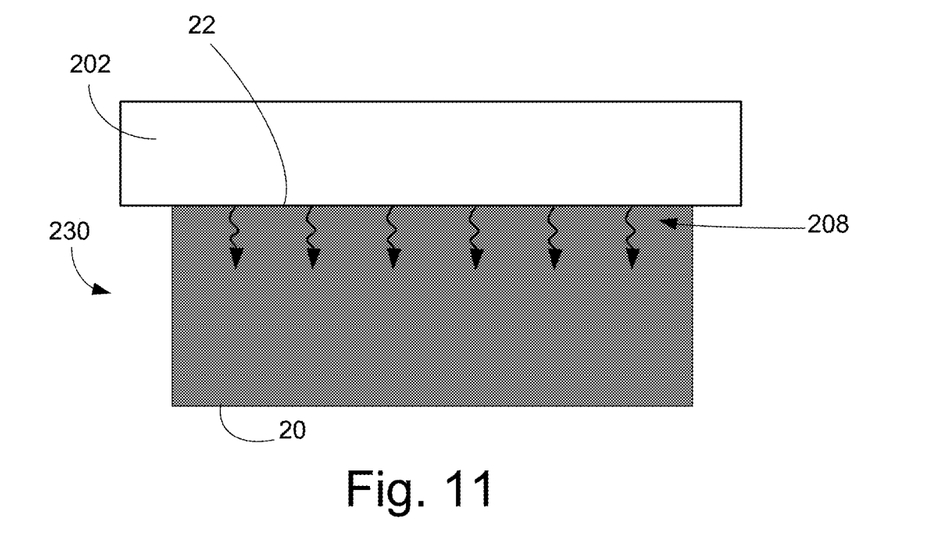
FIG. 11 is a system for making a third composite panel, according to one embodiment.

In one embodiment, the cooled fully consolidated panel 230 can be reheated via an apparatus 200 of FIG. 11. The apparatus 200 includes a heated platen 202 that generates and transmits heat 208 into the bottom surface 22 of the fully consolidated panel 230 via conduction. Although the fully consolidated panel 230 is shown heated by a heated platen 202 via conduction, the fully consolidated panel 230 can be heated by other heating devices via at least one of conduction, convection, and radiation.

As the temperature gradient is formed in the fully consolidated panel 230, the portions of the panel experiencing an increase in temperature start to loft. In this context, lofting is defined as the introduction of air or voids into the panel. Lofting causes a decrease in the consolidation of the panel, and thus a decrease in the fiber density of the panel. Lofting of a fully consolidated panel is induced by increasing a temperature of the panel to a specific temperature at which lofting occurs. The intensity or amount of lofting may be proportional to the amount of time spent at or above this specific temperature. Moreover, the intensity of lofting in the panel can be proportional to the temperature of the panel in some implementations. In other words, the higher the temperature, the more the panel lofts, and vice versa. For this reason, a temperature gradient or non-uniform temperature across a thickness of the panel will induce a lofting gradient or non-uniform lofting across a thickness of the panel, which correspondingly results in a fiber density gradient or non-uniform density across a thickness of the panel. A panel with a fiber density gradient across its thickness can be defined as a density gradient composite panel.

Figure 6:
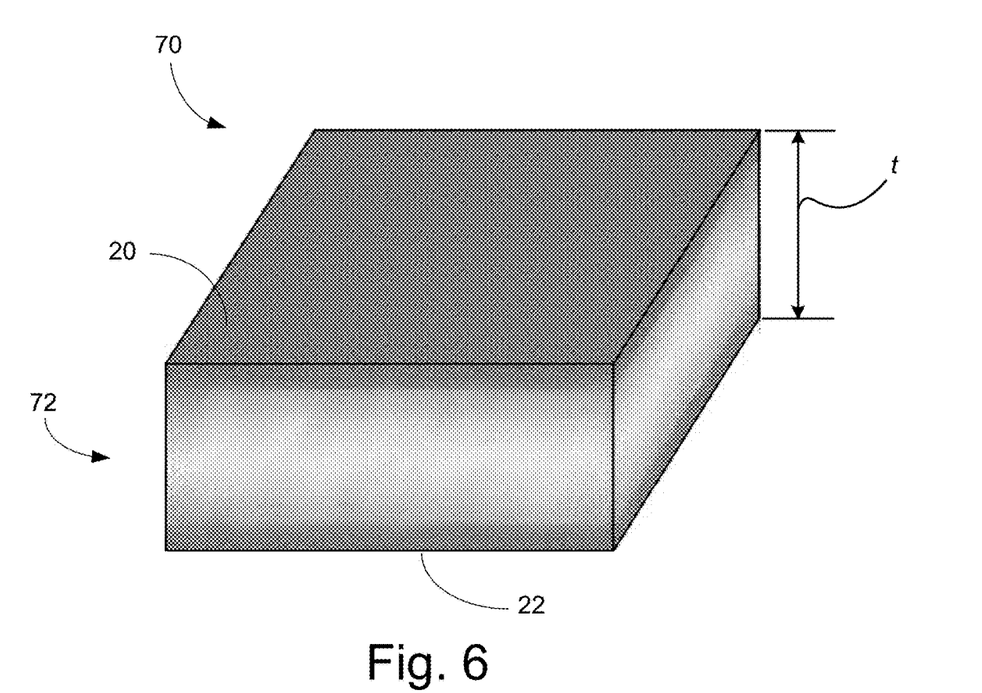
FIG. 6 is a perspective view of a composite panel, according to yet another embodiment.

Referring to FIG. 6, a composite sandwich panel 70 according to another embodiment is shown. Like the composite sandwich panel 60, the composite sandwich panel 70 has a non-uniform density or density gradient across its thickness that is continuous. Moreover, the density gradient of the composite sandwich panel 70 is symmetrical relative to or about a mid-plane of the composite sandwich panel. However, unlike the composite sandwich panel 60, the composite sandwich panel 70 does not include separate subpanels adhered together by an adhesive. Rather, the symmetrical density gradients in the composite sandwich panel 70 are formed together in a single panel or subpanel 72.

According to one embodiment, the composite sandwich panel 70 is formed using the method 500 shown in FIG. 15 and described above. However, after cooling the fully consolidated panel 230 at 540, instead of reheating the fully consolidated panel 230 from only one surface at 550, the fully consolidated panel is reheated from both surfaces. More specifically, in the illustrated embodiment, the fully consolidated panel 230 is reheated from the bottom surface 22 as well as the top surface 20. The heat diffuses into the fully consolidated panel 230 across a thickness of the panel from both surfaces of the panel to form two separate temperature gradients across the thickness of the panel. The temperature gradients are substantially mirror-images of each other. Generally, the temperature of the fully consolidated panel 230 decreases from one surface of the panel to a mid-plane of the panel and increases from the mid-plane to the opposing surface of the panel.

Figure 12:
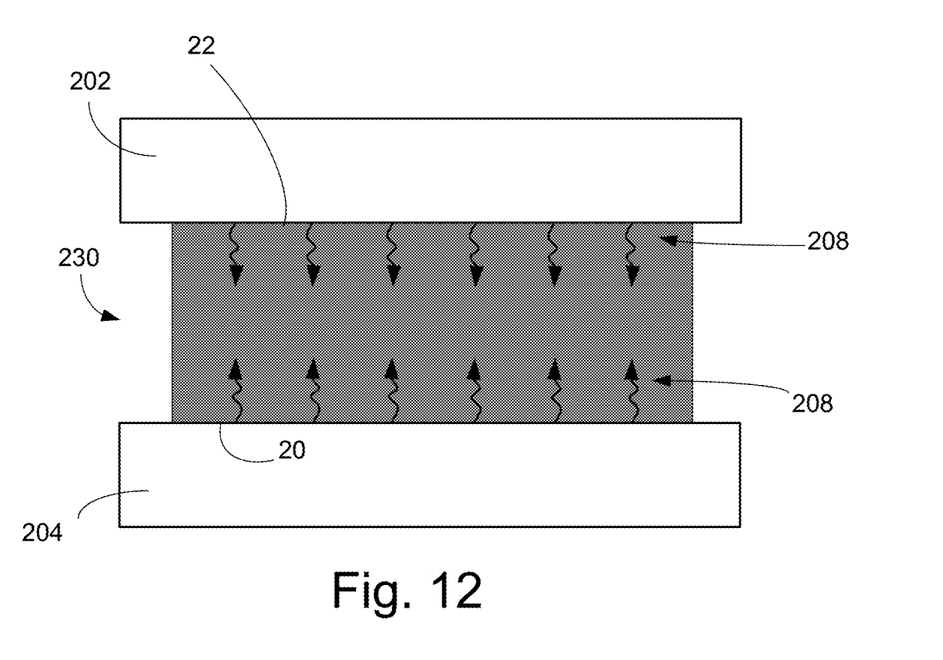
FIG. 12 is a system for making a fourth composite panel, according to one embodiment.

In one embodiment of making the composite sandwich panel 70, the cooled fully consolidated panel 230 can be heated via an apparatus 201 of FIG. 12. The apparatus 201 includes two heated platens 202, 204 that generate and transmit heat 208 into the bottom and top surfaces 22, 20, respectively, of the fully consolidated panel 230 via conduction. Although the fully consolidated panel 230 is shown heated on both surfaces by heated platens 202, 204 via conduction in FIG. 12, the fully consolidated panel 230 can be heated on both surfaces by other heating devices via at least one of conduction, convection, and radiation.

As described above, a temperature gradient or non-uniform temperature across a thickness of the panel will induce a lofting gradient or non-uniform lofting across a thickness of the panel at 560, which correspondingly results in a fiber density gradient or non-uniform density across a thickness of the panel. Accordingly, two temperature gradients across a thickness of the panel will induce two lofting gradients across a thickness of the panel, which correspondingly results in two fiber density gradients across a thickness of the panel.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A composite sandwich panel, comprising:
   a first face portion comprising fully consolidated comingled first fibers and a first thermoplastic matrix;
   a second face portion comprising fully consolidated comingled second fibers and a second thermoplastic matrix; and
   at least one core portion comprising partially consolidated comingled third fibers and a third thermoplastic matrix, the at least one core portion being interposed between the first and second face portions, wherein the at least one core portion has a material composition that is the same as the first face portion and the second face portion;
   wherein the first thermoplastic matrix is melded with the third thermoplastic matrix and the second thermoplastic matrix is melded with the third thermoplastic matrix;
   wherein a density of the fibers across a thickness of the at least one core portion of the composite panel is non-uniform with the density of the fibers being higher within the at least one core portion near the first and second face portions and lower near a center of the at least one core portion, the at least one core portion being free of any sacrificial material; and
   the first, second, and third fibers comprise carbon fibers.

2. The composite sandwich panel of claim 1, wherein a rate of change of the density of the fibers across the thickness of the at least one core portion of the composite sandwich panel is constant.

3. The composite sandwich panel of claim 1, wherein the first fibers, second fibers, and third fibers are randomly oriented.

4. The composite sandwich panel of claim 1, wherein the first, second, and third thermoplastic matrices comprise polyphenylene sulfide.

5. The composite sandwich panel of claim 1, wherein the at least one core portion comprises a plurality of core portions, at least one of the plurality of core portions having a consolidation gradient mirrored by another of the plurality of core portions.

6. The composite sandwich panel of claim 1, wherein the at least one core portion comprises a plurality of core portions each having a different consolidation percentage.

7. A composite panel, comprising:
   a fully consolidated first face portion;
   a fully consolidated second face portion; and
   a core portion interposed between the first and second face portions, the core portion comprising reinforcement fibers in a thermoplastic matrix, wherein a density of the reinforcement fibers across a thickness of the core portion is non-uniform with the density of the reinforcement fibers being higher within the core portion near the first and second face portions and lower near a center of the core portion, with the core portion having a material composition that is the same as the first face portion and the second face portion;
   wherein the composite panel is a single-layered panel; and
   wherein the reinforcement fibers comprise carbon fibers.

8. The composite panel of claim 7, wherein the core portion further comprises a cellular structure formed by a blowing agent.

9. The composite sandwich panel of claim 7, wherein a rate of change of the density of the reinforcement fibers across the thickness of the core portion of the composite sandwich panel is constant.

10. The composite sandwich panel of claim 7, wherein reinforcement fibers are randomly oriented.

11. The composite sandwich panel of claim 7, wherein the thermoplastic matrix comprises polyphenylene sulfide.

12. A composite sandwich panel, comprising:
    a first face portion comprising fully consolidated comingled first fibers and a first thermoplastic matrix;

a second face portion comprising fully consolidated comingled second fibers and a second thermoplastic matrix; and at least one core portion comprising partially consolidated comingled third fibers and a third thermoplastic matrix, the at least one core portion being interposed between the first and second face portions, wherein the at least one core portion has a material composition that is the same as the first face portion and the second face portion;

wherein the first thermoplastic matrix is melded with the third thermoplastic matrix and the second thermoplastic matrix is melded with the third thermoplastic matrix;

wherein a density of the fibers across a thickness of the at least one core portion of the composite panel is non-uniform with the density of the fibers being higher within the at least one core portion near the first and second face portions and lower near a center of the at least one core portion, the at least one core portion being free of any sacrificial material; and wherein the first, second, and third fibers comprise heat-resistant fibers.

13. The composite sandwich panel of claim 12, wherein a rate of change of the density of the fibers across the thickness of the at least one core portion of the composite sandwich panel is constant.

14. The composite sandwich panel of claim 12, wherein the first fibers, second fibers, and third fibers are randomly oriented.

15. The composite sandwich panel of claim 12, wherein the first, second, and third thermoplastic matrices comprise polyphenylene sulfide.

16. The composite sandwich panel of claim 12, wherein the at least one core portion comprises a plurality of core portions, at least one of the plurality of core portions having a consolidation gradient mirrored by another of the plurality of core portions.

17. The composite sandwich panel of claim 12, wherein the at least one core portion comprises a plurality of core portions each having a different consolidation percentage.

* * * * *